(12) United States Patent
Lau et al.

(10) Patent No.: US 9,996,686 B2
(45) Date of Patent: Jun. 12, 2018

(54) PASSWORD RETRIEVAL SYSTEM AND METHOD INVOLVING TOKEN USAGE WITHOUT PRIOR KNOWLEDGE OF THE PASSWORD

(71) Applicant: BlackBerry Limited, Waterloo (CA)

(72) Inventors: Alex Lau, Markham (CA); Mihir Kapadia, Markham (CA); Yunan Zhao, Pickering (CA)

(73) Assignee: BlackBerry Limited, Waterloo, Ontario (CA)

( * ) Notice: Subject to any disclaimer, the term of this patent is extended or adjusted under 35 U.S.C. 154(b) by 589 days.

(21) Appl. No.: 14/263,836

(22) Filed: Apr. 28, 2014

(65) Prior Publication Data
US 2015/0312249 A1   Oct. 29, 2015

(51) Int. Cl.
*H04L 29/06* (2006.01)
*G06F 21/44* (2013.01)
*G06F 21/45* (2013.01)
*G06F 21/62* (2013.01)

(52) U.S. Cl.
CPC .............. *G06F 21/44* (2013.01); *G06F 21/45* (2013.01); *G06F 21/6209* (2013.01); *H04L 63/0428* (2013.01); *H04L 63/083* (2013.01); *G06F 2221/2143* (2013.01)

(58) Field of Classification Search
CPC ............................ H04L 63/0838; G06F 21/44
See application file for complete search history.

(56) References Cited

U.S. PATENT DOCUMENTS

| | | | |
|---|---|---|---|
| 2008/0010453 A1* | 1/2008 | Hamid | 713/159 |
| 2010/0228991 A1* | 9/2010 | Billings et al. | 713/185 |
| 2013/0159699 A1* | 6/2013 | Torkkel | 713/155 |
| 2013/0198824 A1* | 8/2013 | Hitchcock et al. | 726/6 |
| 2015/0248552 A1* | 9/2015 | El Khoury | H04L 63/083 713/155 |

* cited by examiner

*Primary Examiner* — Anthony D Brown
*Assistant Examiner* — William A Corum, Jr.
(74) *Attorney, Agent, or Firm* — Fish & Richardson P.C.

(57) ABSTRACT

A method for managing a master password on a network device, the method stored as a set of instructions executable by a computer processor to: store the master password in a first file in a memory of the network device; store the master password in a second file in the memory of the network device; encrypt access to the first file using a first password; encrypt access to the second file using a second password; send the second password and an identifier associated with the network device over a communications network to a registration server, the registration server configured for storing the second password for subsequent retrieval by the network device; when the first password is unavailable, send a password retrieval request including the identifier; receive the second password configured as a one-time use password; decrypt access to the second file to retrieve the master password; and, initiate a reset process for subsequent storage of the master password in the memory of the network device.

22 Claims, 1 Drawing Sheet

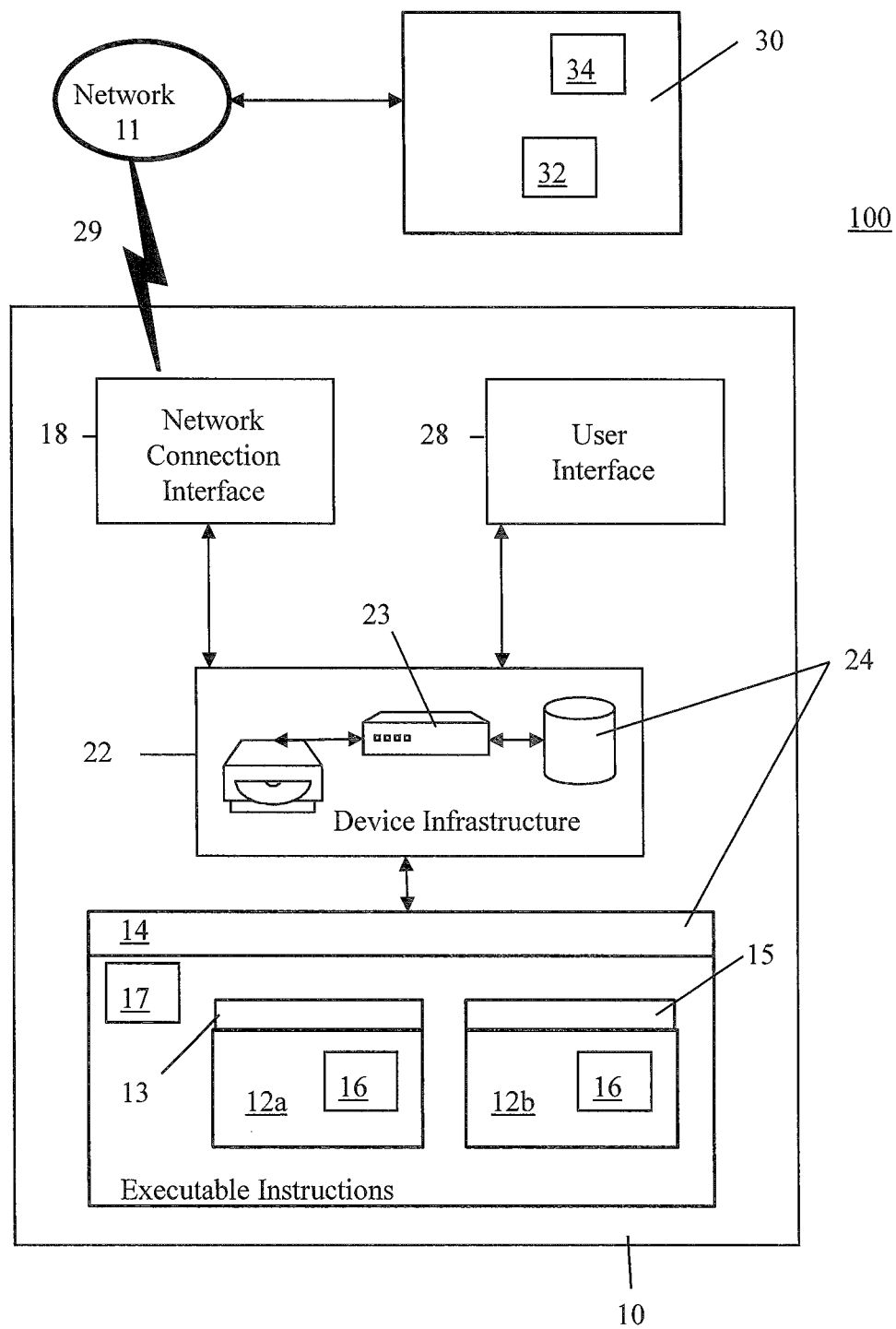

PASSWORD RETRIEVAL SYSTEM AND METHOD INVOLVING TOKEN USAGE WITHOUT PRIOR KNOWLEDGE OF THE PASSWORD

FIELD

This invention relates to the field of computing device security, and more specifically, to a system and method for retrieving passwords.

BACKGROUND

Computing devices include a wide variety of items, including cellular telephones, smartphones, cameras, music and video players, tablets, personal computers, desktop computers, servers, etc. Such devices often include communications capabilities, including for voice and/or data communications, including text messaging, emails, facsimiles, etc. In addition, such devices may include web browser software for browsing Internet websites. Such devices often include the ability to download a wide variety of files from the Internet or other sources, including without limitation files including text, pictures, videos, music, spreadsheets, etc. The use of such devices to store and transmit valuable information has increased. For example, users may store tax returns, bank statements, credit card receipts, passwords for bank accounts, savings and retirement accounts, etc. In addition, valuable personal information may include personal health information, as well as other private information, such as personal correspondence and data.

As such, it has become important to have effective methods and systems to secure such information on various computing devices. Conventional approaches to providing security for such devices include the use of user names and passwords. For example, mobile devices may use a password consisting of a limited number of numeric digits. A password comprising only four numerals provides less security than a password with a greater number of characters. However, even alphanumeric passwords may be overcome or cracked. To protect the information on the device in such situations, it is desirable to make it as difficult as possible for the password to be overcome or cracked.

However, one problem with using a password is that it may be forgotten by a user. For example, if a password is the only way to gain access to privileged or secured data, forgetting the password will often mean that access to the data is lost forever.

SUMMARY

An object of the present invention is to provide a password retrieval system and method to obviate or mitigate at least one of the above-presented disadvantages.

According to one aspect of the invention, there is provided a method for managing a master password on a network device, the method stored as a set of instructions executable by a computer processor to: store the master password in a first file in a memory of the network device; store the master password in a second file in the memory of the network device; encrypt access to the first file using a first password; encrypt access to the second file using a second password; send the second password and an identifier associated with the network device over a communications network to a registration server, the registration server configured for storing the second password for subsequent retrieval by the network device; when the first password is unavailable, send a password retrieval request including the identifier; receive the second password configured as a one-time use password; decrypt access to the second file to retrieve the master password; and, initiate a reset process for subsequent storage of the master password in the memory of the network device.

According to another aspect of the invention, there is provided a method of a registration server for coordinating storage of a master password on a network device, the method stored as a set of instructions executable by a computer processor to: implement a password policy for the network device requiring storage of the master password in a first file encrypted by a first password in a memory of the network device and storage of the master password in a second file encrypted by a second password in the memory of the network device; receive over a communications network from the network device the second password and an identifier associated with the network device; store in a memory the second password associated with the identifier for subsequent retrieval by the network device; when the first password is unavailable, receive a password retrieval request including the identifier; send the second password configured as a one-time use password in response to the password retrieval request; and, initiate a reset process for subsequent storage of the master password in the memory of the network device.

In accordance with further aspects of the invention there is provided an apparatus such as a data processing system, computing device, network device, mobile device, or server, a method for adapting same, as well as articles of manufacture such as a computer readable medium or product and a computer program product or software product (e.g., comprising a non-transitory medium) having program instructions recorded or stored thereon for practicing the method of the invention.

BRIEF DESCRIPTION OF THE DRAWINGS

The foregoing and other aspects will be more readily appreciated having reference to the drawings, wherein:

FIG. 1 is a block diagram illustrating an example configuration of a password retrieval system.

DESCRIPTION

The present invention can be implemented in numerous ways, including as a process or method; an apparatus; a system; a device; a composition of matter; a computer program product embodied on a computer readable storage medium; and/or a processor, such as a processor configured to execute instructions stored on and/or provided by a memory coupled to the processor. In this description, these implementations, or any other form that the invention may take, may be referred to as techniques. In general, the order of the steps of disclosed processes may be altered within the scope of the present invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

A detailed description of one or more embodiments of the present invention is provided below along with accompanying FIGURES that illustrate the principles of the invention. The present invention is described in connection with such embodiments, but the present invention is not limited to any embodiment. The scope of the present invention is limited only by the claims and the present invention encompasses numerous alternatives, modifications and equivalents. Numerous specific details are set forth in the following description in order to provide a thorough understanding of the present invention. These details are provided for the purpose of example and the invention may be practiced according to the claims without some or all of these specific details. For the purpose of clarity, technical material that is known in the technical fields related to the claimed invention has not been described in detail so that the present invention is not unnecessarily obscured.

In this specification and in the claims, the use of the articles "a", "an", or "the" in reference to an item is not intended to exclude the possibility of including a plurality of the item in some embodiments. It will be apparent to one skilled in the art in at least some instances in this description and the attached claims that it would be possible to include a plurality of the item in at least some embodiments.

FIG. 1 is a block diagram illustrating an example configuration of a password retrieval system 100. The system 100 includes one or more data processing systems or network devices 10 coupled to one or more other data processing systems or servers 30 over a network 11. For example, the device 10 may be a fixed or mobile computing device including a desktop computer, a notebook computer, or a wireless device such as a mobile device, mobile telephone, notepad, etc., and the server 30 may be fixed or mobile computing device including as a desktop computer, etc. The components of the device 10 and the server 30 may be similar. The server 30 may be considered to be a device 10.

FIG. 1 shows an example device infrastructure 22 for a device 10 including a network connection interface 18, such as a network interface card (e.g., a SIM card) or a modem, coupled to the device infrastructure 22. The network connection interface 18 is connectable during operation of the device 10 to the network 11 (e.g., an intranet and/or an extranet such as the Internet), which enables the device 10 to communicate with other devices (e.g., server 30) as appropriate. The network 11 can support the communication of messages 29 and related content. As mentioned above, it is recognized that the device infrastructure 22 can be implemented on the device 10 and the server 30.

The device 10 can also have a user interface 28, coupled to the device infrastructure 22, to interact with a user (not shown). The user interface 28 can include one or more user input devices such as but not limited to a QWERTY keyboard, a keypad, a stylus, a mouse, a microphone and the user output device such as a display (e.g., a liquid crystal display ("LCD") screen) and/or a speaker. If the screen is touch sensitive, then the display can also be used as the user input device as controlled by the device infrastructure 22.

Operation of the device 10 is facilitated by the device infrastructure 22. The device infrastructure 22 includes one or more computer processors, processors, or central processing units ("CPU") 23 and can include an associated storage or memory 24. The CPU 23 facilitates performance of the device 10 configured for the intended task (e.g., of the respective applications or modules (e.g., 14, 32)) through operation of the network interface 18, the user interface 28, and other application programs/hardware of the device 10 by executing task related instructions. These task related instructions can be provided by the operating system, and/or software applications (e.g., 14, 32) located in the memory 24, and/or by operability that is configured into the electronic/digital circuitry of the processor(s) designed to perform the specific task(s). Further, it is recognized that the device infrastructure 22 can include a computer readable storage medium coupled to the CPU 23 for providing instructions to the CPU 23 and/or to load/update the instructions. The computer readable medium can include hardware and/or software such as, by way of example only, flash memory, optically readable medium such as CD/DVD, ROMs, and memory cards. In each case, the computer readable medium may take the form of a small disk, hard disk drive, solid-state memory card, or RAM provided in the memory 24. It should be noted that the above listed example computer readable mediums can be used either alone or in combination.

Further, it is recognized that the device 10 can include executable applications/modules (e.g., 14, 32) comprising code or machine readable instructions for implementing predetermined functions/operations including those of an operating system and modules, for example. The CPU 23 as used herein is a configured device and/or set of machine-readable instructions for performing operations as described by example below, including those operations as performed by any or all of the applications/modules 14, 32 firmware and/or operating system. As used herein, the CPU 23 may comprise any one or combination of, hardware, firmware, and/or software. The CPU 23 acts upon information by manipulating, analyzing, modifying, converting or transmitting information for use by an executable procedure or an information device, and/or by routing the information with respect to an output device. The CPU 23 may use or comprise the capabilities of a controller or microprocessor, for example. Accordingly, any of the functionality of the applications/modules may be implemented in hardware, software or a combination of both. Accordingly, the use of a CPU 23 as a device and/or as a set of machine-readable instructions may be referred to herein generically as a processor/module for sake of simplicity.

In view of the above description, the memory 24 of the device 10 can be configured for keeping the stored data in order and the principal (or only) operations on the stored data are the addition/amendment of, processing of, or removal of the stored data from memory 24 (e.g., FIFO, LIFO, etc.). For example, the memory 24 can be a linear data structure for containing and subsequent accessing of the stored data and/or can be a non-linear data structure for containing and subsequent accessing of the stored data.

Further, the memory 24 receives various entities such as data that are stored and held to be processed later. As such, the memory 24 can perform the function of a buffer, which is a region of memory used to temporarily hold data while it is being moved from one place to another (i.e., between devices 10, 30). Typically, the data is stored in the memory 24 when moving the data between processes within/between one or more devices 10, 30. It is recognized that the memory 24 can be implemented in hardware, software, or a combination thereof. The memory 24 is used in the system 100 when there is a difference between the rate/time at which data is received and the rate/time at which the data can be processed (e.g. ultimately by the devices 10, 30).

Further, it will be understood by a person skilled in the art that the memory 24 described herein is the physical place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage such as flash memory. Second, in a more formal usage, memory/storage 24 has been divided into: primary storage, which holds data in memory (sometimes called random access memory or "RAM") and other "built-in" devices such as the processor's cache; and, secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory ("ROM"), flash memory, and cache memory. In addition to hard disks, secondary storage includes a range of device types and technologies, including diskettes, flash memory, Zip drives, redundant array of independent disks (RAID) systems, and holographic storage. Devices that hold storage are collectively known as storage media, storage, or memory 24.

A database is one embodiment of memory 24 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points 10, 30 in a network 11. An object-oriented programming database is one that is congruent with the data defined in object classes and subclasses. Computer databases typically contain aggregations of data records or files, such as transactions, catalogs and inventories, and profiles. Typically, a database manager provides users the capabilities of controlling read/write access, specifying report generation, and analyzing usage. Databases and database managers are prevalent in large mainframe systems, but are also present in smaller distributed workstation and mid-range systems and on personal computers. For example, structured query language ("SQL") is a standard language for making interactive queries from and updating a database.

The memory 24 can also be defined as a physical electronic holding place for instructions and data that the computer's CPU 23 can reach quickly. When the system 10 is in normal operation, its memory usually contains the main parts of the operating system and some or all of the application programs and related data that are being used. Memory is often used as a shorter synonym for random access memory ("RAM") and/or flash memory. This kind of memory can be located on one or more microchips that are physically close to the microprocessor in the system 10.

In terms of a server 30, it is recognized that the network devices 10, 30 can be configured as hardware, software, or typically a combination of both hardware and software to provide a network entity that operates as a socket listener. It is recognised that any computerised process that shares a resource (e.g., data) to one or more client processes can be classified as a server in the system 100. The term "server" can also be generalized to describe a host that is deployed to execute one or more such programs, such that the host can be one or more configured computers that link other computers or electronic devices together via the network 11. The device 30 implementing the functionality of a service can provide specialized services across the network 11 with applications executed on the devices 10, for example to private users inside a large organization or to public users via the Internet 11. In the system 100, the server 30 can have dedicated functionality and/or can share functionality as described. For example, enterprise servers 30 are servers that are used in a business context and can be run on/by any capable computer hardware. In the hardware sense, the word "server" 30 typically designates computer models intended for running software applications under the heavy demand of a network 11 environment. In this client-server configuration one or more machines, either a computer or a computer appliance, share information with each other with one acting as a host for the other. While nearly any personal computer is capable of acting as a network or application server 30, a dedicated server 30 can contain features making it more suitable for production environments. These features may include a faster CPU 23, increased high-performance RAM, and typically more than one large hard drive. More obvious distinctions include marked redundancy in power supplies, network connections, and even the servers themselves.

The server 30 can be represented by physical computer devices (e.g., a configured computer hardware system 10) dedicated to run one or more services (e.g., as a host of the services) to serve the needs of the users of network devices 10 on the network 11. Depending on the computing service (e.g., data processing, data access, etc.) that the server 30 offers, the server 30 could be a database server, file server, mail server, print server, web server, gaming server, or some other kind of server. In the context of client-server architecture, the server 30 can be defined as a computer program running to serve the requests of other programs, the "clients". Thus, the "server" performs some computational task on behalf of "clients". In the present context, the clients run on the network devices 10 and connect through the network 11 with the server 30 affiliated with the client application. It is recognized that the relationship of the client application with its affiliated server 30 is typically done on a one-to-one basis.

As such, the server 30 is capable of acting as a network server for the network device 10 and can contain features (e.g., hardware, software, network connectivity, etc.) making the server 30 more suitable for production environments over the features of the device 10. These features can include a faster CPU 23, increased high-performance RAM, and increased storage capacity in the form of a larger or multiple hard drives, as compared to such features typically had by mobile devices 10. Servers 30 can also have reliability, availability and serviceability ("RAS") and fault tolerance features, such as redundancy in power supplies, storage (as in RAID), and network 11 connections.

The communications network or network 11 comprises a wide area network such as the Internet, however the network 11 may also comprise one or more local area networks 11, one or more wide area networks, or a combination thereof. Further, the network 11 need not be a land-based network, but instead may comprise a wireless network and/or a hybrid of a land-based network and a wireless network for enhanced communications flexibility. The network 11 is used to facilitate network interaction between the devices 10 and the server 30. The network 11 is used to facilitate network interaction between the server 30 and the memory 24 (when configured remotely). In terms of communications (e.g., 29) on the network 11, these communications can be between the systems (e.g., device 10 and device 30) consisting of addressable network packages following a network communication protocol (e.g., TCPIP). It is recognized that mobile devices 10 may not always have stable network connections, and thus may be connected to a network 11 acting as an untrusted or unsecured network (e.g., WiFi hotspot, hostile 3G network, etc.).

According to one embodiment of the invention, there is provided a method and system that allows for the retrieval of a password (e.g., a master password) without prior storing of the password itself (e.g., on a server 30, etc.). If a password is the only way to gain access to privileged or secured data, forgetting the password will often mean that access to the data is lost forever. The present invention allows for password retrieval and thus a user may regain access to privileged or secured data in the event of a forgotten password.

According to one embodiment, a master password is encrypted using a randomly generated token. The now encrypted master password is stored (e.g., on a device 10, server 30, or elsewhere) and the randomly generated token is also stored (e.g., on the device 10, server 30, or elsewhere). To retrieve the master password, the token is fetched and is used to decrypt the encrypted master password.

According to prior methods and systems, a user can retrieve a forgotten password by storing the actual password in some kind of storage (e.g., a database, file, etc.). When the password is forgotten, it is retrieved from this storage and passed back to the device 10 or user so they can gain access to the privileged or secured data protected by the password once again. One disadvantage of this approach is that the password itself has to be passed around multiple times; once when storing it, and once when retrieving it. This introduces more attack vectors where the password can be compromised. The present invention obviates or mitigates this disadvantage because with the present invention only the token used to encrypt the master password is passed around, and never the master password itself. As such, according to one embodiment, there is provided a password retrieval system and method involving token usage without prior knowledge of the password.

In the following, the term "master password" 16 is used to designate the password that grants a user access to privileged or secured data. The "first password" 13 is a user supplied password and the "second password" 15 is a random "token". The first password 13 is the password that often gets "forgotten" by the user. The second password or token 15 is used to decrypt the master password 16 thus granting the user access to the privileged or secured data again. The first password 13 is the password that is normally used to decrypt the master password 16. It is the password that the user remembers from day to day. If the first password 13 is forgotten, then the second password 15 is used to decrypt the master password 16.

For reference, a token or one-time use password is typically an unpredictable combination of random numbers generated according to a specialized algorithm. It can be used as a valid password only for one time. Tokens or one-time use passwords are widely used in many application fields such as online banking, online video gaming, telecommunications, enterprise office work, etc. The token or one-time use password is a safe and convenient anti-theft technology for various accounts. For example, during an online transaction, a token or one-time use password provided by a bank can be used to effectively protect the safety of the transaction and logon verification.

Referring again to FIG. 1, the system 100 may be used for management of a master password 16 stored on a network device 10 (e.g. a mobile device 10, etc.) in a plurality of files 12a, 12b. The master password 16 is stored in a first file 12a in the memory 24 of the device 10 with encrypted access to the first file 12a using a first password 13. The master password 16 is also stored in a second file 12b in the memory 24 of the device 10 with encrypted access to the second file 12b using a second password 15. A password manager 14 (e.g., an application or module provisioned on the device infrastructure 22 of the device 10) provides for intercommunication between a registration server 30 and the device 10 over the network 11, via the network connection interface 18. For example, the password manager 14 can be a client of a password agent 32 (e.g., an application or module provisioned on the device infrastructure 22 of the server 30) of the registration server 30.

A consumer or client application (e.g., 14) is an application or process that requests 29 a service from some other application or process. A service application (e.g., 32) is an application or process that responds 29 to a client (or consumer) application 14 request 29. Many applications 14, 32 can act as both a client and a service, depending on the situation. As such, intercommunication between the applications 14, 32 and/or between the applications 14 and the on-board devices (e.g., user interface 28) can be performed via communicating respective service programming interfaces.

For example, a client application 14 (e.g., an application or module provisioned on the device infrastructure 22 of the device 10) may provide for intercommunication between the server 30 and the device 10 over the network 11, via the network connection interface 18. The client applications 14 may be a client of a service application 32 (e.g., an application or module provisioned on the device infrastructure 22 of the server 30) of the server 30.

The registration server 30 implements a password policy 34 (e.g., an application or module provisioned on the device infrastructure 22 of the server 30) defining storage of the master password 16 in the first file 12a encrypted by the first password 13 in the memory 24 of the device 10 and storage of the master password 16 in the second file 12b encrypted by the second password 15 in the memory 24 of the device 10. The registration server 30 is also configured to receive the second password 15 (or confirmation of use of the second password 15 in encryption of the second file 12b) and an identifier 17 associated with the device 10 over the network 11.

According to one embodiment, the password agent 32 of the registration server 30 is configured for storing the second password 15 for subsequent retrieval by the device 10. The password agent 32 is configured for retrieving the second password 15 that matches the identifier 17 and sending the second password in response 29 to the retrieval request 29. The second password 15, once received by the device 10 from the registration server 30, is considered as a one-time use password or token for decrypting access to the second file 12b to retrieve the master password 16.

According to another embodiment, the second password 15 is retrieved by a human administrator who then conveys the second password 15 to the user of the device 10 via an "out-of-band" channel such as a telephone call. The user of the device 10 can then use the second password 15 to decrypt the master password 16 via the user interface 28 of the device 10.

The first file 12a is an artifact generated by encrypting the master password 16 with the first password 13. Likewise, the second file 12b is an artifact generated by encrypting the master password 16 with the second password 15. Note that the first and second files 12a, 12b may be constructs other than files.

The above embodiments may contribute to an improved password retrieval method and system 100, 10, 30 and may provide one or more advantages. First, with the present invention, passing around of the master password 16 is reduced thus reducing attack vectors as only the token 15 used to encrypt the master password 16 is passed around, and never the master password 16 itself. Second, the present invention provides a password retrieval method and system involving token 15 usage without prior knowledge of the master password 16.

Thus, according to one embodiment of the invention, there is provided a method for managing a master password 16 on a network device 10, the method stored as a set of instructions 14 executable by a computer processor 23 to: store the master password 16 in a first file 12a in a memory 24 of the network device 10; store the master password 16 in a second file 12b in the memory 24 of the network device 10; encrypt access to the first file 12a using a first password 13; encrypt access to the second file 12b using a second password 15; send the second password 15 and an identifier associated 17 with the network device 10 over a communications network 11 to a registration server 30, the registration server 30 configured for storing the second password 15 for subsequent retrieval by the network device 10; when the first password 13 is unavailable (e.g., forgotten by a user), send a password retrieval request 29 including the identifier 17; receive the second password 15 configured as a one-time use password; decrypt access to the second file 12b to retrieve the master password 16; and, initiate a reset process for subsequent storage of the master password 16 in the memory 24 of the network device 10.

The above method may further include to implement the reset process the set of instructions 14 executable by the computer processor 23 to: delete the first file 12a from the memory 24; delete the second file 12b from the memory 24; store the master password 16 in a third file in the memory 24; store the master password 16 in a fourth file in the memory 24; encrypt access to the third file using a third password different from the first password; encrypt access to the fourth file using a fourth password different from the second password; and, send the fourth password and the identifier 17 associated with the network device 10 over the communications network 11 to the registration server 30, the registration server 30 configured for storing the fourth password for subsequent retrieval by the network device 10. The second password 15 may be a unique identifier embodied as a token. The second password 15 may be generated by a user of the network device 10. The second password 15 may be generated by the registration server 30 and sent to the network device 10 for use in said encrypt access to the second file 12b, said send the second password 15 may contain a confirmation of use of the second password 15 to encrypt the second file 12 rather than the second password 15 itself. The method may further include the set of instructions 14 executable by the computer processor 23 to: receive by the network device 10 an update password request 29 from the registration server 30 prior to said send the fourth password. Said send a password retrieval request including the identifier 17 may be communicated by a user of the network device 10 manually via a phone call (for example) with an administrator of the registration server 30. The set of instructions 14 may be implemented as a password manager 14 provisioned on the network device 10, the password manager 14 configured as a client of the registration server 30. The method may further include the set of instructions 14 executable by the computer processor to: restrict subsequent usage of the second password 15 for access to the master password 16 after said decrypt access to the second file 15 in order to enforce one-time use of said one-time use password. And, the first file 12a may include a memory address of the memory 24, the memory address being the memory location of the stored master password 16.

According to another embodiment, there is provided a method of a registration server 30 for coordinating storage of a master password 16 on a network device 10, the method stored as a set of instructions 32 executable by a computer processor 23 to: implement a password policy 34 for the network device 10 requiring storage of the master password 16 in a first file 12a encrypted by a first password 13 in a memory 24 of the network device 10 and storage of the master password 16 in a second file 12b encrypted by a second password 15 in the memory 24 of the network device 10; receive over a communications network 11 from the network device 10 the second password 15 and an identifier 17 associated with the network device 10; store in a memory 24 the second password 15 associated with the identifier 17 for subsequent retrieval by the network device 10; when the first password 13 is unavailable (e.g., forgotten by a user), receive a password retrieval request 29 including the identifier 17; send the second password 15 configured as a one-time use password in response to the password retrieval request 29; and, initiate a reset process for subsequent storage of the master password 16 in the memory 24 of the network device 10.

In the above method, the password policy 34 may require deletion of the first file 12a from the memory 24 of the network device 10 and deletion of the second file 12b from the memory 24 of the network device 10, the method may further include to implement the reset process the set of instructions 32 executable by the computer processor 23 to: receive a third password and the identifier 17 associated with the network device 10 over the communications network 11 from the network device 10, the third password different from the second password such that the third password represents a password used to encrypt access to a third file storing the master password 16 in the memory 24 of the network device 10; and, store the third password for subsequent retrieval by the network device 10. The second password 15 may be a unique identifier embodied as a token. The second password 15 may be generated by a user of the network device 10. The second password 15 may be generated by the registration server 30 and sent to the network device 10 for use in encrypting access to the second file 12b, said receive the second password 15 may contain a confirmation of use of the second password 15 to encrypt the second file 12b rather than the second password 15 itself. The method may further include the set of instructions 32 executable by a computer processor 23 to: send to the network device 10 an update password request prior to said receive the third password. Said receive a password retrieval request may be the identifier 17 communicated by a user of the network device 10 manually via a phone call (for example) with an administrator of the registration server 30. The set of instructions 32 may be implemented as a password agent 32 provisioned on the registration server 30, the password agent 32 configured in a client-server relationship with a password manager 14 of the network device 10. The method may further include the set of instructions 32 executable by the computer processor 23 to: restrict subsequent usage of the second password 15 for access to the master password 16 in order to enforce one-time use of said one-time use password. And, the first file 12a may include a memory address of the memory 24, the memory address being the memory location of the stored master password 16.

The embodiments of the invention described above are intended to be examples only. Those skilled in this art will understand that various modifications of detail may be made to these embodiments, all of which come within the scope of the invention.

What is claimed is:

1. A method for managing a master password on a network device, the method stored as a set of instructions executable by a computer processor to:
   store the master password in a first file in a memory of the network device;
   store the master password in a second file in the memory of the network device;
   encrypt access to the first file using a first password;
   encrypt access to the second file using a second password, the second password being different from the first password; and
   while the master password is stored in the first file and the second file at the network device:
      send, from the network device, the second password and an identifier associated with the network device over a communications network to a registration server, the registration server configured for storing the second password for subsequent retrieval by the network device;
      when the first password is not received from a user of the network device, send a password retrieval request including the identifier;
      in response to sending the password retrieval request, receive the second password configured as a one-time use password;
      decrypt access to the second file to retrieve the stored master password using the received second password; and,
      initiate a reset process for subsequent storage of the master password in the memory of the network device.

2. The method of claim 1, further comprising to implement the reset process the set of instructions executable by the computer processor to:
   delete the first file from the memory;
   delete the second file from the memory;
   store the master password in a third file in the memory;
   store the master password in a fourth file in the memory;
   encrypt access to the third file using a third password different from the first password;
   encrypt access to the fourth file using a fourth password different from the second password; and
   send the fourth password and the identifier associated with the network device over the communications network to the registration server, the registration server configured for storing the fourth password for subsequent retrieval by the network device.

3. The method of claim 1, wherein the second password is a unique identifier embodied as a token.

4. The method of claim 1, wherein the second password is generated by the user of the network device.

5. The method of claim 1, wherein the second password is generated by the registration server and sent to the network device for use in said encrypt access to the second file, said send the second password contains a confirmation of use of the second password to encrypt the second file rather than the second password itself.

6. The method of claim 2, further comprising the set of instructions executable by the computer processor to: receive by the network device an update password request from the registration server prior to said send the fourth password.

7. The method of claim 1, wherein said send a password retrieval request including the identifier is communicated by the user of the network device manually via a phone call with an administrator of the registration server.

8. The method of claim 1, wherein the set of instructions is implemented as a password manager provisioned on the network device, the password manager configured as a client of the registration server.

9. The method of claim 8, further comprising the set of instructions executable by the computer processor to: restrict subsequent usage of the second password for access to the master password after said decrypt access to the second file in order to enforce one-time use of said one-time use password.

10. The method of claim 1, wherein the first file includes a memory address of the memory, the memory address being the memory location of the stored master password.

11. A method of a registration server for coordinating storage of a master password on a network device, the method stored as a set of instructions executable by a computer processor to:
   implement a password policy for the network device requiring storage of the master password in a first file encrypted by a first password in a memory of the network device and storage of the master password in a second file encrypted by a second password in the memory of the network device, the second password being different from the first password; and
   while the master password is stored in the first file and the second file at the network device:
      receive over a communications network from the network device the second password and an identifier associated with the network device;
      store in a memory the second password associated with the identifier for subsequent retrieval by the network device;
      when the first password is not received from a user of the network device, receive a password retrieval request including the identifier;
      in response to receiving the password retrieval request, send the second password configured as a one-time use password in response to the password retrieval request; and,
      initiate a reset process for subsequent storage of the master password in the memory of the network device.

12. The method of claim 11, wherein the password policy requires deletion of the first file from the memory of the network device and deletion of the second file from the memory of the network device, the method further comprising to implement the reset process the set of instructions executable by the computer processor to:
   receive a third password and the identifier associated with the network device over the communications network from the network device, the third password different from the second password such that the third password represents a password used to encrypt access to a third file storing the master password in the memory of the network device; and,
   store the third password for subsequent retrieval by the network device.

13. The method of claim 11, wherein the second password is a unique identifier embodied as a token.

14. The method of claim 11, wherein the second password is generated by the user of the network device.

15. The method of claim 11, wherein the second password is generated by the registration server and sent to the network device for use in encrypting access to the second file, said receive the second password contains a confirmation of use of the second password to encrypt the second file rather than the second password itself.

16. The method of claim 12, further comprising the set of instructions executable by a computer processor to: send to the network device an update password request prior to said receive the third password.

17. The method of claim 11, wherein said receive a password retrieval request is the identifier communicated by the user of the network device manually via a phone call with an administrator of the registration server.

18. The method of claim 11, wherein the set of instructions is implemented as a password agent provisioned on the registration server, the password agent configured in a client-server relationship with a password manager of the network device.

19. The method of claim 18, further comprising the set of instructions executable by the computer processor to: restrict subsequent usage of the second password for access to the master password in order to enforce one-time use of said one-time use password.

20. The method of claim 11, wherein the first file includes a memory address of the memory, the memory address being the memory location of the stored master password.

21. A network device for managing a master password, comprising:
   a processor coupled to memory and a communications network; and,
   one or more modules within the memory and executable by the processor to:
      store the master password in a first file in the memory of the network device;
      store the master password in a second file in the memory of the network device;
      encrypt access to the first file using a first password;
      encrypt access to the second file using a second password, the second password being different from the first password; and
      while the master password is stored in the first file and the second file at the network device:
         send the second password and an identifier associated with the network device over the communications network to a registration server, the registration server configured for storing the second password for subsequent retrieval by the network device;
         when the first password is not received from a user of the network device, send a password retrieval request including the identifier;
         in response to sending the password retrieval request, receive the second password configured as a one-time use password;
         decrypt access to the second file to retrieve the stored master password using the received second password; and,
         initiate a reset process for subsequent storage of the master password in the memory of the network device.

22. A registration server for coordinating storage of a master password on a network device, comprising:
   a processor coupled to server memory and a communications network; and,
   one or more modules within the server memory and executable by the processor to:
      implement a password policy for the network device requiring storage of the master password in a first file encrypted by a first password in a memory of the network device and storage of the master password in a second file encrypted by a second password in the memory of the network device, the second password being different from the first password; and
      while the master password is stored in the first file and the second file at the network device:
         receive over the communications network from the network device the second password and an identifier associated with the network device;
         store in a memory the second password associated with the identifier for subsequent retrieval by the network device;
         when the first password is not received from a user of the network device, receive a password retrieval request including the identifier;
         in response to receiving the password retrieval request, send the second password configured as a one-time use password in response to the password retrieval request; and,
         initiate a reset process for subsequent storage of the master password in the memory of the network device.

* * * * *